US012619693B2

(12) United States Patent
Kumar et al.

(10) Patent No.: US 12,619,693 B2
(45) Date of Patent: May 5, 2026

(54) USER CREDENTIAL AUTHENTICATION USING BLOCKCHAIN AND MACHINE LEARNING

(71) Applicant: Bank of America Corporation, Charlotte, NC (US)

(72) Inventors: Ashok Kumar, Telangana (IN); Narsing Raj, Telangana (IN); Siva Kumar Venkata Lakshmi Sai Devulapalli, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 509 days.

(21) Appl. No.: 18/047,323

(22) Filed: Oct. 18, 2022

(65) Prior Publication Data

US 2024/0126849 A1 Apr. 18, 2024

(51) Int. Cl.
*G06F 21/31* (2013.01)
*H04L 9/40* (2022.01)
*H04L 41/16* (2022.01)

(52) U.S. Cl.
CPC ............ *G06F 21/316* (2013.01); *H04L 41/16* (2013.01); *H04L 63/08* (2013.01)

(58) Field of Classification Search
CPC ....... G06F 21/316; H04L 41/16; H04L 63/08; H04L 43/16
See application file for complete search history.

(56) References Cited

U.S. PATENT DOCUMENTS

| | | | | |
|---|---|---|---|---|
| 10,425,353 | B1 * | 9/2019 | Vadera | ................. H04L 43/045 |
| 10,523,682 | B1 * | 12/2019 | Badawy | ............. H04L 63/1408 |
| 10,755,507 | B2 | 8/2020 | Zwink et al. | |
| 10,831,935 | B2 | 11/2020 | Vijayasankar et al. | |
| 10,871,922 | B2 | 12/2020 | East | |
| 11,218,324 | B2 | 1/2022 | Wentz et al. | |
| 2018/0247191 | A1 | 8/2018 | Katz et al. | |
| 2019/0114632 | A1 | 4/2019 | Rome et al. | |
| 2019/0236598 | A1 | 8/2019 | Padmanabhan | |

(Continued)

FOREIGN PATENT DOCUMENTS

| | | |
|---|---|---|
| CA | 3066903 A1 | 1/2019 |
| DE | 112020002310 T5 | 2/2022 |
| KR | 20200004666 A | 1/2020 |

*Primary Examiner* — Shewaye Gelagay
*Assistant Examiner* — Thomas A Carnes

(57) ABSTRACT

A method for user credential authentication includes receiving real-time logs from a blockchain network that is configured to perform an authentication process of a user. The real-time logs are normalized and bucketized to generate processed real-time logs, which are stored in a block and are added to a blockchain. The processed real-time logs are analyzed to identify the plurality of real-time behavioral patterns of the user. A first authentication score is determined by comparing a first real-time behavioral pattern to a respective first historical behavioral pattern. The first authentication score is compared to a first authentication score threshold, which corresponds to the first real-time behavioral pattern and the respective first historical behavioral pattern. In response to the first authentication score being less than the first authentication score threshold, a first instruction is sent to the blockchain network to temporarily stop the authentication process of the user.

20 Claims, 2 Drawing Sheets

(56)     References Cited

U.S. PATENT DOCUMENTS

| | | | |
|---|---|---|---|
| 2019/0238316 A1 | 8/2019 | Padmanabhan | |
| 2019/0356736 A1 | 11/2019 | Narayanaswamy et al. | |
| 2020/0026834 A1 | 1/2020 | Vimadalal et al. | |
| 2020/0134143 A1* | 4/2020 | Deole | G06F 21/64 |
| 2020/0178198 A1 | 6/2020 | Ding et al. | |
| 2020/0358760 A1 | 11/2020 | Krishan | |
| 2020/0404069 A1 | 12/2020 | Li et al. | |
| 2021/0051015 A1 | 2/2021 | Widmann et al. | |
| 2021/0089635 A1* | 3/2021 | Weeresinghe | G06Q 20/40145 |
| 2022/0067752 A1* | 3/2022 | Fang | H04L 63/20 |
| 2022/0086131 A1* | 3/2022 | Kinai | G06N 20/00 |
| 2022/0114245 A1 | 4/2022 | Krishan | |
| 2023/0074414 A1* | 3/2023 | Mudigonda | G06F 16/254 |
| 2024/0126849 A1* | 4/2024 | Kumar | H04L 43/16 |

* cited by examiner

USER CREDENTIAL AUTHENTICATION USING BLOCKCHAIN AND MACHINE LEARNING

TECHNICAL FIELD

The present disclosure relates generally to a secure user credential authentication, and more specifically to a system and method for user credential authentication using blockchain and machine learning.

BACKGROUND

User identity and access management is important for many organizations. The identity and access management has an important role in identifying, authenticating, and authorizing access to various services or systems. Central identity management systems are usually used for identity and access management. The central identity management systems are usually the first targets of hackers or bad actors for gaining unauthorized system-wide access to various services or systems of an organization. As a risk of security threats continues to increase, the central identity management systems are becoming "single-points of failure."

SUMMARY

The system described in the present disclosure provides several practical applications and technical advantages that overcome the current technical problems with user credential authentication, such as, for example, problems associated with "single-point of failure" of centralized identity management systems. The following disclosure is particularly integrated into practical applications of improving the security of user credential authentication. This, in turn, improves the security of the underlying computer system.

The system disclosed in the present application provides a technical solution to the technical problems discussed above by providing an authentication system that uses a combination of distributed blockchain and artificial intelligence/machine learning (AI/ML) to authenticate a user before allowing the user access to requested resources. The authentication system is a decentralized system that includes a distributed blockchain network communicatively coupled to an authentication monitoring system. The blockchain network includes a peer-to-peer network of nodes, with each of the nodes storing a copy of a blockchain. The disclosed authentication system provides several practical applications and technical advantages, which include a process for providing enhanced information security by using storing hashed user credentials in blockchains of the distributed blockchain network, and by using a majority consensus mechanism of the peer-to-peer network of nodes to validate user credentials of the user. The immutability of the blockchain allows for the secure storage of the hashed user credentials. The majority consensus mechanism allows for avoiding "single-point of failure" issues for the authentication system, since the authentication system may be compromised if a majority of the nodes (and not a single node) are hijacked by a bad actor, which requires insurmountable amount of computing resources and is impractical.

The authentication monitoring system implements AI/ML algorithms to monitor the user credential authentication process performed by the distributed blockchain network. The authentication monitoring system receives real-time logs from the distributed blockchain network and determines a real-time behavioral pattern of the user from the real-time logs. The real-time behavioral patterns are compared to historical behavioral patterns stored in the authentication monitoring system to determine a suspicious activity. In response to determining that the real-time behavior of the user does not match the real-time behavior of the user, the authentication monitoring system sends an instruction to the distributed blockchain network to temporarily stop (or pause) the authentication process of the user. The authentication monitoring system requests a confirmation from the user that it is indeed the user who initiated the authentication process. In response to receiving a positive response from the user, the authentication monitoring system sends an instruction to the distributed blockchain network to resume the authentication process of the user. In response to receiving a negative response from the user or in response to not receiving a response at all, the authentication monitoring system sends an instruction to the distributed blockchain network to terminate the authentication process of the user. Furthermore, the authentication monitoring system stores the real-time and historical logs in a blockchain, which is in turn is stored in a database. This allows for improved security due to immutability of the blockchain and improved data retrieval speed due to using the database. Accordingly, the authentication monitoring system further improves the security of the authentication process, since a bad actor will be denied an access even if the bad actor obtains access to the user credentials of the user. This process provides information security because a bad actor will need to both obtain the user credentials of the user and replicate the behavioral pattern of the user to successfully complete the authentication process.

In one embodiment, an apparatus includes a blockchain network including a plurality of nodes and an authentication monitoring system communicatively coupled to the blockchain network. The blockchain network is configured to perform an authentication process of a user. The authentication monitoring system includes a memory storing a machine learning algorithm and a database and a processor communicatively coupled to the memory. The database includes a blockchain storing historical logs associated with historical authentication events of the user, a plurality of historical behavioral patterns of the user, where the plurality of historical behavioral patterns are identifiable from the historical logs, and a plurality of authentication score thresholds, where each of the plurality of authentication score thresholds corresponds to a respective one of the plurality of historical behavioral patterns. The processor, when executing the machine learning algorithm, is configured to receive real-time logs from the blockchain network. The real-time logs are associated with a plurality of real-time behavioral patterns of the user during the authentication process of the user. The real-time logs are normalized and bucketized to generate processed real-time logs. The processed real-time logs are stored in a block. The block is added to the blockchain. The processed real-time logs are analyzed to identify the plurality of real-time behavioral patterns of the user. A first authentication score is determined by comparing a first real-time behavioral pattern to a respective first historical behavioral pattern. The first authentication score is compared to a first authentication score threshold. The first authentication score threshold corresponds to the first real-time behavioral pattern and the respective first historical behavioral pattern. In response to the first authentication score being less than the first authentication score threshold, a first instruction is sent to the blockchain network to temporarily stop the authentication process of the user.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, where like reference numerals represent like parts.

DETAILED DESCRIPTION

Figure 1:
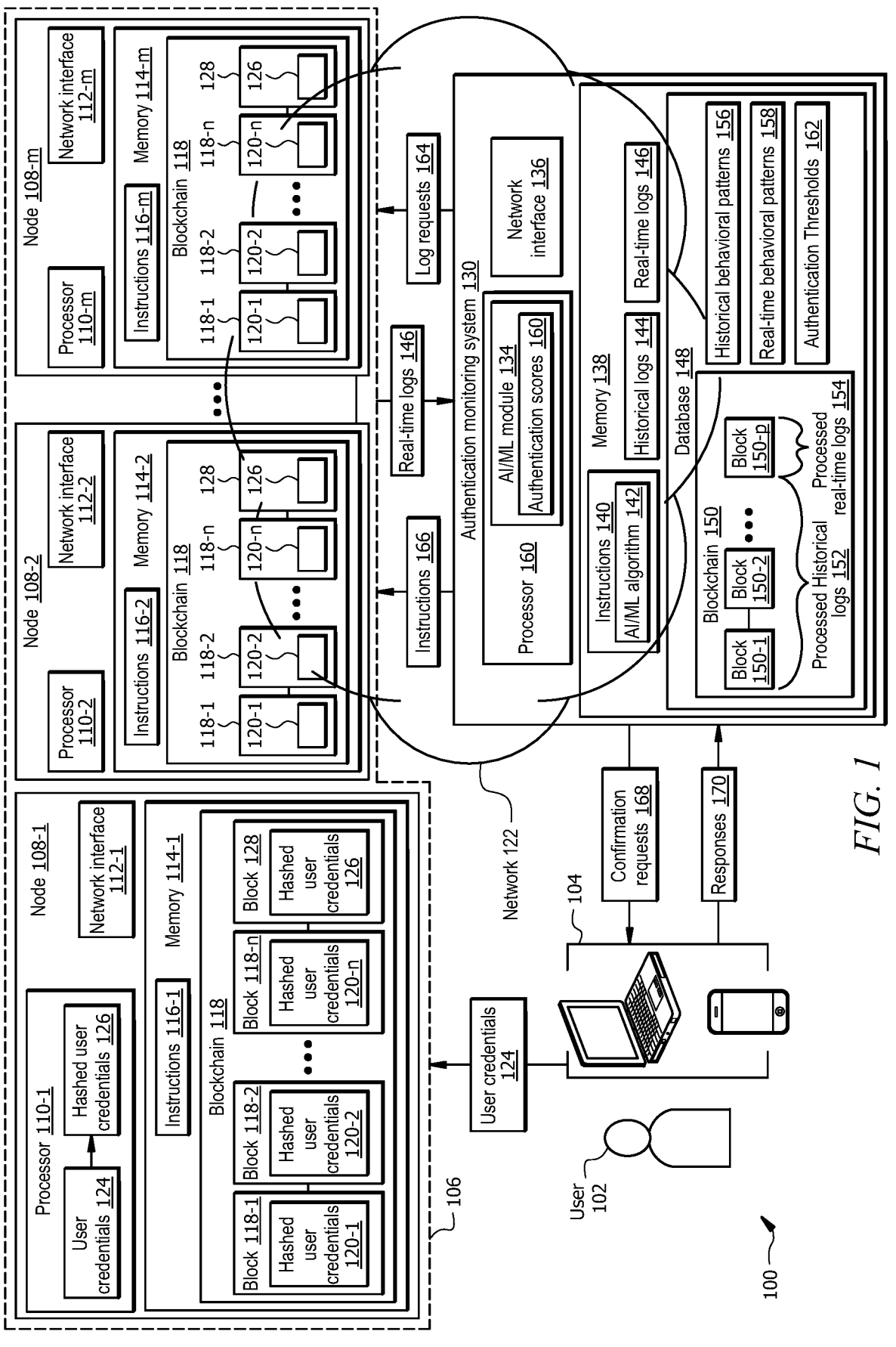
FIG. 1 illustrates an embodiment of a system configured to authenticate user credentials of a user.
Figure 2:
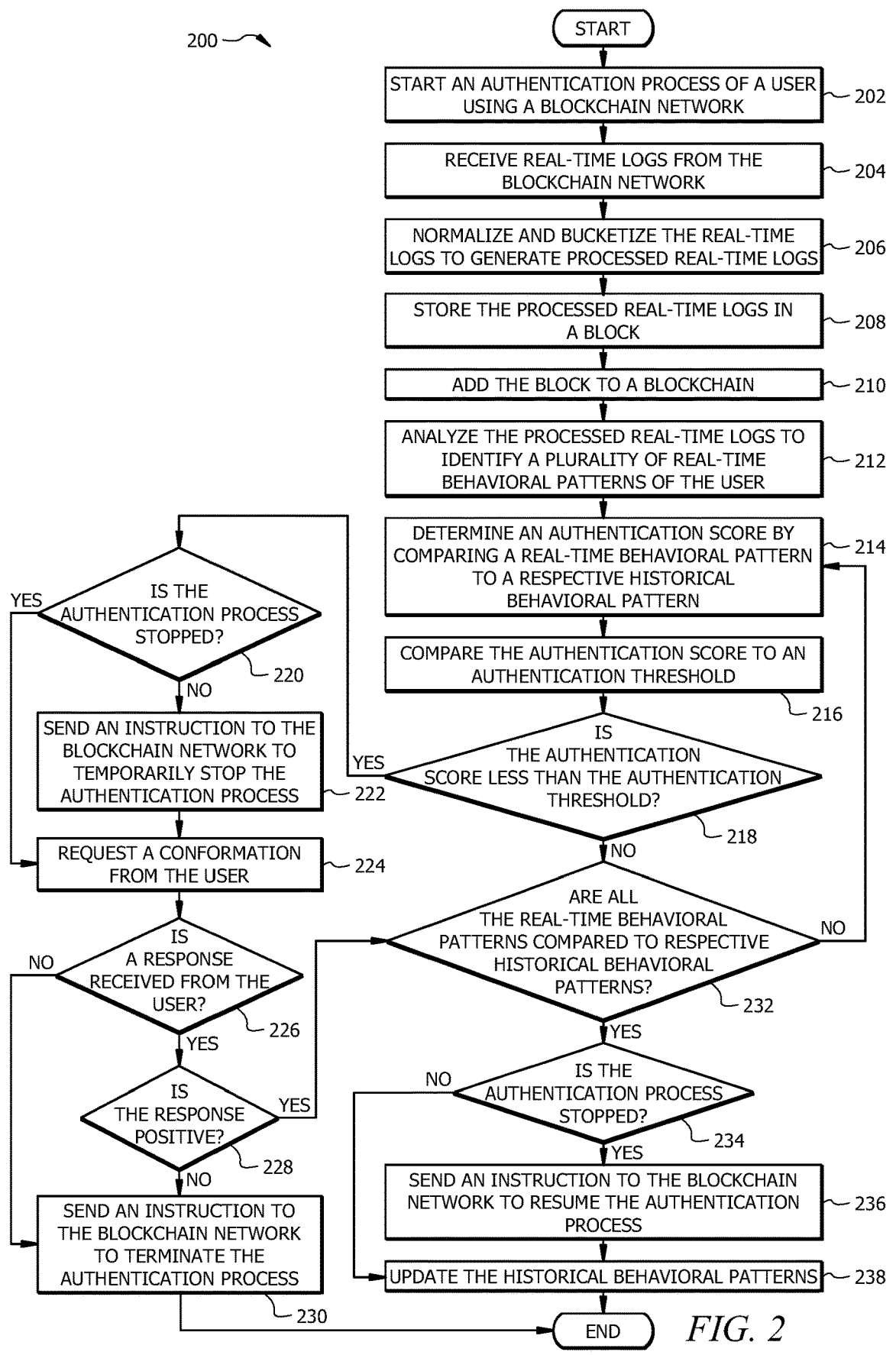
FIG. 2 illustrates an example operational flow of system of FIG. 1 for authenticating user credentials of a user.

As described above, previous technologies fail to provide efficient, secure, and reliable solutions for user credential authentication. Embodiments of the present disclosure and its advantages may be understood by referring to FIGS. 1 and 2. FIGS. 1 and 2 are used to describe a system and method for user credential authentication.

System Overview

FIG. 1 illustrates an embodiment of a system 100 that is generally configured to authenticate user credentials of a user. In certain embodiments, the system 100 comprises a distributed blockchain network 106 that is operably coupled to a computing device 104 and an authentication monitoring system 130 via a network 122. Network 122 enables the communication between the components of the system 100. The distributed blockchain network 106 comprises a peer-to-peer network of nodes 108 (e.g., nodes 108-1 through 108-m) and is configured to perform a user credential authentication process, while the authentication monitoring system 130 is configured to monitor the user credential authentication process and temporarily stop (pause), resume, or terminate the user credential authentication process based on behavioral patterns of a user 102. In other embodiments, system 100 may not have all the components listed and/or may have other elements instead of, or in addition to, those listed above. For example, the authentication monitoring system 130 may be integrated into any of the nodes 108 of the distributed blockchain network 106.

System Components

Network

Network 122 may be any suitable type of wireless and/or wired network. The network 122 may or may not be connected to the Internet or public network. The network 122 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, and/or any other suitable network. The network 122 may be configured to support any suitable type of communication protocol as would be appreciated by one of ordinary skill in the art.

Computing Device

Computing device 104 is generally any device that is configured to process data and interact with a user 102. Examples of the computing device 104 include, but are not limited to, a personal computer, a desktop computer, a workstation, a server, a laptop, a tablet computer, a mobile phone (such as a smartphone), etc. The computing device 104 may include a user interface, such as a display, a microphone, keypad, or other appropriate terminal equipment usable by the user 102. The computing device 104 may include a hardware processor, memory, and/or circuitry (not explicitly shown) configured to perform any of the functions or actions of the computing device 104 described herein. For example, a software application designed using software code may be stored in the memory and executed by the processor to perform the functions of the computing device 104. The computing device 104 is configured to communicate with other components of the system 100 via the network 122, such as the distributed blockchain network 106 and the authentication monitoring system 130. The user 102 may initiate a user credential authentication process from the computing device 104. For example, the computing device 104 may communicate user credentials 124 to the distributed blockchain network 106 via the network 122. The computing device 104 may also receive various requests (e.g., confirmation requests 168) from the authentication monitoring system 130 and communicate various responses (e.g., responses 170) to the authentication monitoring system 130 via the network 122.

Distributed Blockchain Network

The distributed blockchain network 106 comprises a peer-to-peer network of nodes 108 (e.g., nodes 108-1 through 108-m) and is configured to perform a user credential authentication process, while the authentication monitoring system 130 is configured monitor the user credential authentication process and temporarily stop (pause), resume, or terminate the user credential authentication process based on behavioral patterns of the user 102. The user 102 may imitate a user credential authentication process by sending user credentials 124 to the distributed blockchain network 106 via the computing device 104.

Each of the plurality of nodes 108 (e.g., nodes 108-1 through 108-m) is generally any device that is configured to process data and communicate with other components of the system 100 via the network 122. Each of the nodes 108 comprises a respective one of processors 110 (e.g., processors 110-1 through 110-m) in signal communication with a respective one of memories 114 (e.g., memories 114-1 through 114-m) and a respective one of network interfaces 112 (e.g., network interfaces 112-1 through 112-m). Each of the processors 110 may comprise one or more processors operably coupled to a respective one of the memories 114.

Each of the processors 110 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Each of the processors 110 may be a programmable logic device, a microcontroller, a microprocessor, or any suitable combination of the preceding. The one or more processors are configured to process data and may be implemented in hardware or software. For example, each of the processors 110 may be 8-bit, 16-bit, 32-bit, 64-bit, or of any other suitable architecture. Each of the processors 110 is configured to implement various software instructions. For example, each of the processors 110 is configured to execute respective ones of software instructions 116 (e.g., software instructions 116-1 through 116-$m$) that are stored in a respective one of the memories 114 in order to perform the operations described herein.

Each of the network interfaces 112 is configured to enable wired and/or wireless communications (e.g., via network 122). Each of the network interfaces 112 is configured to communicate data between a respective one of the nodes 108 and other components of the system 100. For example, each of the network interfaces 112 may comprise a WIFI interface, a local area network (LAN) interface, a wide area network (WAN) interface, a modem, a switch, or a router. Each of the network interfaces 112 may be configured to use any suitable type of communication protocol as would be appreciated by one of ordinary skill in the art.

Each of the memories 114 may be volatile or non-volatile and may comprise a read-only memory (ROM), random-access memory (RAM), ternary content-addressable memory (TCAM), dynamic random-access memory (DRAM), and static random-access memory (SRAM). Each of the memories 114 may be implemented using one or more disks, tape drives, solid-state drives, and/or the like. Each of the memories 114 is operable to store respective ones of software instructions 116, and/or any other data and instructions. Each of the software instructions 114 may comprise any suitable set of software instructions, logic, rules, or code.

Each of the memories 114 is further configured to store a copy of a blockchain 118. The blockchain 118 comprises a plurality of blocks 118-1 through 118-$n$. Each of the plurality of blocks 118-1 through 118-$n$ corresponds to a respective authentication event and comprises a respective one of hashed user credentials 120-1 through 120-$n$ of the user 102. By storing the hashed user credentials 120-1 through 120-$n$ instead of the user credentials themselves, the security of the user credential authentication process is improved since it is not possible to reverse-engineer user credentials of the user 102 from the hashed user credentials 120-1 through 120-$n$ of the user 102

The distributed blockchain network 106 is configured to receive the user credentials 124 of the user 102 via the computing device 104. The user credentials 124 may comprise a username and password, a PIN number, or any other information which uniquely identifies the user 102. The user credentials 124 may be received by any of the nodes 108 of the distributed blockchain network 106. In an embodiment when the node 108-1 receives the user credentials 124, the processor 110-1 of the node 108-1 performs a hashing process to generates hashed user credentials 126 from the user credentials 124. The hashing process may comprise applying one or more suitable hashing algorithms. The hashing algorithms may be stored in memory 114-1 and may be part of the instructions 116-1.

The processor 110-1 compares the hashed user credentials 126 of the user 102 to the hashed user credentials stored in the blockchain 118. In an embodiment, the processor 110-1 may compare the hashed user credentials 126 of the user 102 to the hashed user credentials 120-$n$ stored in the most recent block 118-$n$ of the blockchain 118. The processor 110-1, upon determining that the hashed user credentials 126 of the user 102 match the hashed user credentials stored in the blockchain 118, creates a block 128 corresponding to the authentication event and stores the hashed user credentials 126 in the block 128. The processor 110-1 sends the block 128 from the node 108-1 to other nodes 108-2 through

108-$m$ of the distributed blockchain network 106 for validation. In an embodiment, the user credentials 124 are validated if majority of the nodes 108 of the distributed blockchain network 106 confirm the validity of the block 128. In response to confirming the validity of the block 128, the authentication process of the user 102 is successfully completed. Subsequently, the processor 110-1 adds the block 128 to the blockchain 118 of the node 108-1. The update is then distributed to other nodes 108-2 through 108-$m$ of the distributed blockchain network 106.

In an embodiment when the majority of the nodes 108 of the distributed blockchain network 106 do not confirm the validity of the block 128, the authentication process of the user 102 is terminated. In response to not confirming the validity of the block 128, the authentication process of the user 102 is terminated. In such an embodiment, the block 128 is not added to the blockchains 118 of the nodes 108.

Authentication Monitoring System

The authentication monitoring system 130 is generally any device that is configured to process data and communicate with other components of the system 100 via the network 122. The authentication monitoring system 130 may comprise a processor 132 in signal communication with a memory 138 and a network interface 136.

Processor 132 comprises one or more processors operably coupled to the memory 138. The processor 132 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 132 may be a programmable logic device, a microcontroller, a microprocessor, or any suitable combination of the preceding. The one or more processors are configured to process data and may be implemented in hardware or software. For example, the processor 132 may be 8-bit, 16-bit, 32-bit, 64-bit, or of any other suitable architecture. The one or more processors are configured to implement various software instructions to perform the operations described herein. For example, the one or more processors are configured to execute software instructions 140 and to implement the artificial intelligence/machine learning (AI/ML) module 134 and perform one or more functions described herein. The software instructions 140 may comprise AI/ML algorithm 142 providing instructions to the processor 132 to implement the AI/ML module 134. In this way, the processor 132 may be a special-purpose computer designed to implement the functions disclosed herein. The processor 132 is configured to operate as described in FIGS. 1 and 2.

Network interface 136 is configured to enable wired and/or wireless communications (e.g., via network 122). The network interface 136 is configured to communicate data between the authentication monitoring system 130 and other components of the system 100. For example, the network interface 136 may comprise a WIFI interface, a local area network (LAN) interface, a wide area network (WAN) interface, a modem, a switch, or a router. The processor 132 is configured to send and receive data using the network interface 136. The network interface 136 may be configured to use any suitable type of communication protocol as would be appreciated by one of ordinary skill in the art.

Memory 138 may be volatile or non-volatile and may comprise a read-only memory (ROM), random-access memory (RAM), ternary content-addressable memory (TCAM), dynamic random-access memory (DRAM), and static random-access memory (SRAM). Memory 138 may be implemented using one or more disks, tape drives, solid-state drives, and/or the like. The memory 138 may store any of the information described in FIGS. 1 and 2 along with any other data, instructions, logic, rules, or code operable to implement the function(s) described herein when executed by processors 132. The memory 138 is operable to store software instructions 140, and/or any other data and instructions. The software instructions 140 may comprise any suitable set of software instructions, logic, rules, or code operable to be executed by the processor 132.

The memory 138 may store various logs while the system 100 performs a user credential authentication process of the user 102. For example, the logs may be behavioral logs associated with the user 102, such as the historical behavioral logs 144 and real-time behavioral logs 146 associated with the user 102. The historical behavioral logs 144 comprise behavioral logs associated with historical authentication events of the user 102. The real-time behavioral logs 144 comprise behavioral logs associated with a current authentication event of the user 102. The behavior logs may comprise authentication time logs, user location logs, an authentication frequency logs, user time zone logs, or any other logs capturing a behavior of the user 102.

The memory 138 may further comprise a database 148 that stores a blockchain 150. Blockchain 150 comprises a plurality of blocks 150-1 through 150-$p$, such that each block is associated with a corresponding user credential authentication event. The blockchain 150 stores processed historical logs 152 and processed real-time logs 154. The processed historical logs 152 comprise normalized and bucketized historical logs 144 and the processed real-time logs 154 comprise normalized and bucketized real-time logs 146. The bucketization process may group the behavioral logs based on a type of the behavioral logs. For example, behavioral logs related to a location of the user 102 may be grouped together, and the behavioral logs related to an authentication time of the user 102 may be grouped together. In an embodiment, the processed real-time logs 154 are stored in the most recent block 150-$p$ of the blockchain 150 and the processed historical logs 152 are stored in the blocks 150-1 through 150-($p$−1) of the blockchain 150.

The database 148 further stores historical behavioral patterns 156 and real-time behavioral patterns 158 of the user 102. The historical behavioral patterns 156 are determined by analyzing the processed historical logs 152. The historical behavioral patterns 156 may comprise historical location information of the user 102, historical time zone information of the user 102, historical authentication frequency information of the user 102, or historical authentication time information of the user 102. The real-time behavioral patterns 158 are determined by analyzing the processed real-time logs 154. The real-time behavioral patterns 158 may comprise real-time location information of the user 102, real-time time zone information of the user 102, real-time authentication frequency information of the user 102, or real-time authentication time information of the user 102.

The database 148 further stores authentication thresholds 162. The authentication thresholds 162 are minimal authentication scores that are acceptable for determining closeness of a real-time behavioral pattern and a respective historical behavioral pattern of a user. As described below in greater detail, the processor 132 is configured to determine authentication scores 160, that quantify closeness of the real-time behavioral patterns 158 and respective historical behavioral patterns 156. The authentication scores 160 are compared to respective authentication thresholds 162 to determine if the desired closeness in historical and rea-time user behaviors is achieved.

The authentication scores 160 may be values between 0 and 1 (or percentages between 0% and 100%), such that the value 1 (or the percentage 100%) corresponds to perfect match between the real-time behavioral patterns 158 and respective historical behavioral patterns 156, and the value 0 (or the percentage 0%) corresponds to complete mismatch between the real-time behavioral patterns 158 and respective historical behavioral patterns 156. The authentication thresholds 162 may be any desired values between 0 and 1 (or the percentages between 0% and 100%) based on security requirements for the system 100.

Artificial Intelligence/Machine Learning Module

AI/ML module 134 may be implemented by the processor 132 executing the software instructions 140 (in particular, an AI/ML algorithm 142), and is generally configured to monitor the authentication process of the user 102. For example, the AI/ML module 134 determines the real-time behavioral patterns 156 of the user 102 and compares them to the real-time behavioral patterns 158 of the user 102. Upon detecting that the current behavior of the user 102 is unusual, the AI/ML module 134 sends to the distributed blockchain network 106 an instruction to temporarily stop (or pause) the user credential authentication process. The AI/ML module 134 sends the user 102 a request for confirming that it is indeed the user that initiated the user credential authentication. Upon receiving the positive response, the AI/ML module 134 sends to the distributed blockchain network 106 an instruction to resume the user credential authentication process. Upon receiving the negative response or upon not receiving the response at all, the AI/ML module 134 sends to the distributed blockchain network 106 an instruction to terminate the user credential authentication process.

In certain embodiments, the AI/ML module 134 may be implemented by a support vector machine, neural network, random forest, k-means clustering, etc. In certain embodiments, the AI/ML module 134 may be implemented by a plurality of neural network layers, convolutional neural network layers, Long-Short-Term-Memory (LSTM) layers, Bi-directional LSTM layers, recurrent neural network layers, and the like. In certain embodiments, the AI/ML module 134 may be implemented by a text processing, natural language processing, and the like. In certain embodiments, the AI/ML module 134 may be implemented by unsupervised, semi-supervised, and/or supervised machine learning techniques. In certain embodiments, the AI/ML module 134 may be implemented using a k-nearest neighbors (KNN) algorithm, a decision-tree algorithm, or a regression algorithm.

In certain embodiments, the AI/ML module 134 may be configured to perform operations of method 200 (see FIG. 2) as described below in greater detail.

Example Method for Monitoring a User Credential
Authentication Process

FIG. 2 illustrates an example flowchart of a method 200 for monitoring a user credential authentication process. Modifications, additions, or omissions may be made to method 200. Method 200 may include more, fewer, or other operations. For example, operations may be performed in parallel or in any suitable order. For example, one or more operations of method 200 may be implemented, at least in part, in the form of the software instructions 140 (in particular, the AI/ML algorithm 142) of FIG. 1, stored on non-transitory, tangible, machine-readable medium (e.g., memory 138 of FIG. 1) that when executed by one or more processors (e.g., any of the processors 110 and 132 of FIG. 1) implements an AI/ML module (e.g., AI/ML module 134 of FIG. 1) and may cause the one or more processors to perform operations 202-238.

At operation 202, the distributed blockchain network 106 starts a user credential authentication process of a user (e.g., user 102 of FIG. 1). The authentication process may be initiated by the user by providing user credentials (e.g., the user credentials 124 of FIG. 1) of the user to the distributed blockchain network 106.

At operation 204, the one or more processors receive real-time logs (e.g., real-time logs 146 of FIG. 1) from the distributed blockchain network 106. The real-time logs are associated with a current authentication process of the user. The real-time logs comprise information on real-time behavior of the user. In an embodiment, the one or more processors send log requests (e.g., log requests 164 of FIG. 1) to the distributed blockchain network 106 and the real-time logs are received from the distributed blockchain network 106 in response to the log requests.

At operation 206, the one or more processors normalize and bucketize the real-time logs to generate processed real-time logs (e.g., processed real-time logs 154 of FIG. 1). The bucketization process may group the real-time logs based on a type of the real-time logs. For example, real-time logs related to a location of the user may be grouped together, and the real-time logs related to an authentication time of the user may be grouped together.

At operation 208, the one or more processors store the processed real-time logs in a block (e.g., block 150-p of FIG. 1).

At operation 210, the one or more processors add the block to a blockchain (e.g., blockchain 150 of FIG. 1). The blockchain may be stored in a database (e.g., database 148 of FIG. 1).

At operation 212, the one or more processors analyze the processed real-time logs to identify a plurality of real-time behavioral patterns (e.g., real-time behavioral patterns 158 of FIG. 1) of the user. The plurality of real-time behavioral patterns may be stored in the database.

At operation 214, the one or more processors determine an authentication score (e.g., one of authentication scores 160 of FIG. 1) by comparing one of the real-time behavioral patterns to a respective one of the plurality of historical behavioral patterns (e.g., historical behavioral patterns 156 of FIG. 1). The authentication scores and the historical behavioral patterns may be stored in the database.

At operation 216, the one or more processors compare the authentication score to a respective authentication threshold (e.g., one of authentication thresholds 162 of FIG. 1).

At operation 218, the one or more processors determines if the authentication score is less than the respective authentication threshold. In response to determining that the authentication score is less than the respective authentication threshold, the method 200 continues to operation 220. In response to determining that the authentication score is not less than the respective authentication threshold, the method 200 continues to operation 232.

At operation 220, in response to determining that the authentication score is less than the respective authentication threshold, the one or more processors determine if the authentication processes is stopped. In response to determining that the authentication process is stopped, the method continues to operation 224. In response to deter-mining that the authentication process is not stopped, the method continues to operation 222.

At operation 222, in response to determining that the authentication process is not stopped, the one or more processors send an instruction (e.g., instruction 166 of FIG. 1) to the blockchain network to temporarily stop (or pause) the authentication process of the user.

At operation 224, the one or more processors request from the user a confirmation (e.g., confirmation request 168 of FIG. 1) that it is indeed the user who initiated the authentication process.

At operation 226, the one or more processors determine if a response (e.g., response 170 of FIG. 1) is received from the user. In response to determining that the response is received from the user, the method 200 continues to operation 228. In response to determining that the response is not received from the user, the method 200 continues to operation 230.

At operation 228, in response to determining that the response is received from the user, the one or more processors determine if the response is positive or not. In response to determining that the response is not positive, the method 200 continues to operation 230. In response to determining that the response is positive, the method 200 continues to operation 232.

At operation 230, in response to determining that the response is not received from the user or in response to determining that the response is not positive, the one or more processors send an instruction (e.g., instruction 166 of FIG. 1) to the blockchain network to terminate the authentication process.

At operation 232, the one or more processors determine if all the real-time behavioral patterns have been compared to respective historical behavioral patterns. In response to determining that not all the real-time behavioral patterns have been compared to respective historical behavioral patterns, the method continues to operation 214. In some embodiments, the operations 214 through 228 are repeated until all the real-time behavioral patterns have been com-pared to the respective historical behavioral patterns. In response to determining that all the real-time behavioral patterns have been compared to the respective historical behavioral patterns, the method continues to operation 234.

At operation 234, in response to determining that all the real-time behavioral patterns have been compared to the respective historical behavioral patterns, the one or more processors determine if the authentication processes is stopped. In response to determining that the authentication process is stopped, the method 200 continues to operation 236. In response to determining that the authentication process is not stopped, the method 200 continues directly to operation 238 and skips operation 236.

At operation 236, in response to determining that the authentication process is stopped, the one or more processors send an instruction (e.g., instruction 166 of FIG. 1) to resume the authentication process.

At operation 238, the one or more processors update the historical behavioral patterns based on the real-time behavioral patterns. For example, if the real-time behavioral patterns include a new location information of the user, the one or more processors may update the historical behavioral patterns to include to the new location information.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An apparatus comprising:
a blockchain network comprising a plurality of nodes, wherein the blockchain network is configured to perform an authentication process of a user;
an authentication monitoring system communicatively coupled to the blockchain network, wherein the authentication monitoring system comprises:
a memory storing a machine learning algorithm and a database, wherein the database comprises:
a blockchain storing historical logs associated with historical authentication events of the user, wherein the blockchain comprises a plurality of blocks and the historical logs are stored in a first set of blocks of the plurality of blocks and wherein each block of the first set of blocks stores a corresponding historical log;
a plurality of historical behavioral patterns of the user, wherein the plurality of historical behavioral patterns are identifiable from the historical logs and wherein the historical behavioral patterns comprise historical location information of the user and historical authentication time information of the user; and
a plurality of authentication score thresholds, wherein each of the plurality of authentication score thresholds corresponds to a respective one of the plurality of historical behavioral patterns;
a processor communicatively coupled to the memory, wherein the processor, when executing the machine learning algorithm, is configured to:
receive real-time logs from the blockchain network, wherein the real-time logs comprise real-time logs related to a real-time location and a real-time authentication time information of the user during the authentication process of the user;
normalize and bucketize the real-time logs to generate processed real-time logs, wherein the real-time logs are bucketed based on grouping the real-time location of the user and grouping the real-time authentication time information of the user;
store the processed real-time logs in a second block;

add the second block to the blockchain, wherein the second block is added after the first set of blocks on the blockchain;
analyze the processed real-time logs to identify a plurality of real-time behavioral patterns of the user, wherein the plurality of real-time behavioral patterns comprises a real-time location information of the user and a real-time authentication time information of the user; and
determine a plurality of authentication scores based on comparing one or more of a plurality of real-time behavioral patterns with a respective one or more of a plurality of historical behavioral patterns, wherein:
the plurality of authentication scores comprises a first authentication score and a second authentication score;
the plurality of real-time behavioral patterns comprises a first real-time behavioral pattern and a second real-time behavioral pattern;
the plurality of historical behavioral patterns comprises a first historical behavioral pattern and a second historical behavioral pattern;
wherein the determining the plurality of authentication scores comprises:
determining the first authentication score by comparing the first real-time behavioral pattern to the respective first historical behavioral pattern, wherein the first real-time behavioral pattern comprises the real-time location information of the user and the first historical behavioral pattern is the historical location information of the user;
comparing the first authentication score to a first authentication score threshold, wherein the first authentication score threshold corresponds to the first real-time behavioral pattern and the respective first historical behavioral pattern; and
in response to the first authentication score being less than the first authentication score threshold, sending a first instruction to the blockchain network to temporarily stop the authentication process of the user;
in response to the first authentication score being greater than or equal to the first authentication score threshold, determining the second authentication score by comparing the second real-time behavioral pattern to the respective second historical behavioral pattern;
comparing the second authentication score to a second authentication score threshold, wherein the second authentication score threshold corresponds to the second real-time behavioral pattern and the respective second historical behavioral pattern; and
in response to the second authentication score being less than the second authentication score threshold, sending a second instruction to the blockchain network to temporarily stop the authentication process of the user.

2. The apparatus of claim 1, wherein the historical behavioral patterns comprise time zone information of the user, or authentication frequency information of the user.

3. The apparatus of claim 1, wherein the processor is further configured to:

after sending the first instruction to blockchain network to temporarily stop the authentication process of the user, request from the user a confirmation that it is indeed the user who initiated the authentication process;

determine if a response from the user is received or not;

in response to determining that the response is received, determine if the response is positive or negative; and in response to determining that the response is positive, send a second instruction to the blockchain network to resume the authentication process of the user.

4. The apparatus of claim 3, wherein the processor is further configured to:

in response to determining that the response is negative, send a third instruction to the blockchain network to terminate the authentication process of the user.

5. The apparatus of claim 3, wherein the processor is further configured to:

in response to determining that the response is not received, send a third instruction to the blockchain network to terminate the authentication process of the user.

6. The apparatus of claim 1, wherein the second real-time behavioral pattern is the real-time authentication time information of the user and the second historical behavioral pattern is the historical authentication time of the user.

7. The apparatus of claim 1, wherein the processor is further configured to:

update the plurality of historical behavioral patterns based on the plurality of real-time behavioral patterns.

8. A method comprising:

receiving real-time logs from a blockchain network, wherein the blockchain network is configured to perform an authentication process of a user, and wherein the real-time logs comprise real-time logs related to a real-time location and a real-time authentication time information of the user during the authentication process of the user, wherein the blockchain network comprises a blockchain;

storing, in the blockchain, historical logs associated with historical authentication events of the user, wherein the blockchain comprises a plurality of blocks and the historical logs are stored in a first set of blocks of the plurality of blocks and wherein each block of the first set of blocks stores a corresponding historical log;

normalizing and bucketizing the real-time logs to generate processed real-time logs, wherein the real-time logs are bucketed based on grouping the real-time location of the user and grouping the real-time authentication time information of the user;

storing the processed real-time logs in a second block;

adding the second block to a blockchain, wherein the second block is added after the first set of blocks on the blockchain;

analyzing the processed real-time logs to identify a plurality of real-time behavioral patterns of the user, wherein the plurality of real-time behavioral patterns comprises a real-time location information of the user and a real-time authentication time information of the user; and determining a plurality of authentication scores based on comparing one or more of a plurality of real-time behavioral patterns with a respective one or more of a plurality of historical behavioral patterns, wherein:

the plurality of authentication scores comprises a first authentication score and a second authentication score;

the plurality of real-time behavioral patterns comprises a first real-time behavioral pattern and a second real-time behavioral pattern; and the plurality of historical behavioral patterns comprises a first historical behavioral pattern and a second historical behavioral pattern; and wherein the determining the plurality of authentication scores comprises:

determining the first authentication score by comparing the first real-time behavioral pattern to the respective first historical behavioral pattern, wherein the first real-time behavioral pattern comprises the real-time location information of the user and the first historical behavioral pattern is a historical location information of the user;

comparing the first authentication score to a first authentication score threshold, wherein the first authentication score threshold corresponds to the first real-time behavioral pattern and the respective first historical behavioral pattern; and in response to the first authentication score being less than the first authentication score threshold, sending a first instruction to the blockchain network to temporarily stop the authentication process of the user;

in response to the first authentication score being greater than or equal to the first authentication score threshold, determining the second authentication score by comparing the second real-time behavioral pattern to the respective second historical behavioral pattern;

comparing the second authentication score to a second authentication score threshold, wherein the second authentication score threshold corresponds to the second real-time behavioral pattern and the respective second historical behavioral pattern; and in response to the second authentication score being less than the second authentication score threshold, sending a second instruction to the blockchain network to temporarily stop the authentication process of the user.

9. The method of claim 8, wherein the historical behavioral patterns comprise time zone information of the user, authentication frequency information of the user, or authentication time information of the user.

10. The method of claim 8, further comprising:

after sending the first instruction to blockchain network to temporarily stop the authentication process of the user, requesting from the user a confirmation that it is indeed the user who initiated the authentication process;

determining if a response from the user is received or not;

in response to determining that the response is received, determining if the response is positive or negative; and in response to determining that the response is positive, sending a second instruction to the blockchain network to resume the authentication process of the user.

11. The method of claim 10, further comprising:

in response to determining that the response is negative, sending a third instruction to the blockchain network to terminate the authentication process of the user.

12. The method of claim 10, further comprising:

in response to determining that the response is not received, sending a third instruction to the blockchain network to terminate the authentication process of the user.

13. The method of claim 8, wherein the second real-time behavioral pattern is the real-time authentication time information of the user and the second historical behavioral pattern is the historical authentication time of the user.

14. The method of claim 8, further comprising:
updating the plurality of historical behavioral patterns based on the plurality of real-time behavioral patterns.

15. A non-transitory computer-readable medium storing instructions that, when executed by a processor, cause the processor to:
receive real-time logs from a blockchain network, wherein the blockchain network is configured to perform an authentication process of a user, and wherein the real-time logs comprise real-time logs related to a real-time location and a real-time authentication time information of the user during the authentication process of the user, wherein the blockchain network comprises a blockchain;
store, in the blockchain, historical logs associated with historical authentication events of the user, wherein the blockchain comprises a plurality of blocks and the historical logs are stored in a first set of blocks of the plurality of blocks and wherein each block of the first set of blocks stores a corresponding historical log;
normalize and bucketize the real-time logs to generate processed real-time logs, wherein the real-time logs are bucketed based on grouping the real-time location of the user and grouping the real-time authentication time information of the user;
store the processed real-time logs in a second block;
add the second block to a blockchain, wherein the second block is added after the first set of blocks on the blockchain;
analyze the processed real-time logs to identify a plurality of real-time behavioral patterns of the user, wherein the plurality of real-time behavioral patterns comprises a real-time location information of the user and a real-time authentication time information of the user; and
determine a plurality of authentication scores based on comparing one or more of a plurality of real-time behavioral patterns with a respective one or more of a plurality of historical behavioral patterns, wherein:
the plurality of authentication scores comprises a first authentication score and a second authentication score;
the plurality of real-time behavioral patterns comprises a first real-time behavioral pattern and a second real-time behavioral pattern; and
the plurality of historical behavioral patterns comprises a first historical behavioral pattern and a second historical behavioral pattern; and
wherein the determining the plurality of authentication scores comprises:
determining the first authentication score by comparing the first real-time behavioral pattern to the respective first historical behavioral pattern, wherein the first real-time behavioral pattern comprises the real-time location information of the user and the first historical behavioral pattern is a historical location information of the user;
comparing the first authentication score to a first authentication score threshold, wherein the first authentication score threshold corresponds to the first real-time behavioral pattern and the respective first historical behavioral pattern; and
in response to the first authentication score being less than the first authentication score threshold, sending a first instruction to the blockchain network to temporarily stop the authentication process of the user;
in response to the first authentication score being greater than or equal to the first authentication score threshold, determining the second authentication score by comparing the second real-time behavioral pattern to the respective second historical behavioral pattern;
comparing the second authentication score to a second authentication score threshold, wherein the second authentication score threshold corresponds to the second real-time behavioral pattern and the respective second historical behavioral pattern; and
in response to the second authentication score being less than the second authentication score threshold, sending a second instruction to the blockchain network to temporarily stop the authentication process of the user.

16. The non-transitory computer-readable medium of claim 15, wherein the historical behavioral patterns comprise time zone information of the user, authentication frequency information of the user, or authentication time information of the user.

17. The non-transitory computer-readable medium of claim 15, wherein the instructions, when executed by the processor, further cause the processor to:
after sending the first instruction to blockchain network to temporarily stop the authentication process of the user, request from the user a confirmation that it is indeed the user who initiated the authentication process;
determine if a response from the user is received or not;
in response to determining that the response is received, determine if the response is positive or negative; and
in response to determining that the response is positive, send a second instruction to the blockchain network to resume the authentication process of the user.

18. The non-transitory computer-readable medium of claim 17, wherein the instructions, when executed by the processor, further cause the processor to:
in response to determining that the response is negative, send a third instruction to the blockchain network to terminate the authentication process of the user.

19. The non-transitory computer-readable medium of claim 17, wherein the instructions, when executed by the processor, further cause the processor to:
in response to determining that the response is not received, send a third instruction to the blockchain network to terminate the authentication process of the user.

20. The non-transitory computer-readable medium of claim 15, wherein the second real-time behavioral pattern is the real-time authentication time of the user and the second historical behavioral pattern is the historical authentication time of the user.

*    *    *    *    *